United States Patent [19]

Trocherie

[11] Patent Number: 4,648,720
[45] Date of Patent: Mar. 10, 1987

[54] BEATING/EMULSIFYING TOOL FOR A DOMESTIC ELECTRICAL APPLIANCE FOR FOOD PREPARATION

[75] Inventor: Jean-Pierre Trocherie, Villaines-la-Juhel, France

[73] Assignee: Moulinex Societe Anonyme, Bagnolet, France

[21] Appl. No.: 739,603

[22] Filed: May 29, 1985

[30] Foreign Application Priority Data

Jan. 29, 1985 [FR] France .................................. 85 01209

[51] Int. Cl.$^4$ .............................................. B01F 7/26
[52] U.S. Cl. ..................................... 366/306; 366/317; 366/314; 416/184; 416/199
[58] Field of Search ............... 366/317, 304, 306, 307, 366/314, 205, 315, 265; 99/348; 416/199, 184, DIG. 3

[56] References Cited

U.S. PATENT DOCUMENTS

| | | | |
|---|---|---|---|
| 2,424,679 | 7/1947 | Cowles | 366/317 |
| 3,679,323 | 7/1972 | Buck | 416/184 |
| 4,199,268 | 4/1980 | Parzych | 366/306 |
| 4,577,975 | 3/1986 | Crory | 366/205 |

Primary Examiner—Robert W. Jenkins
Attorney, Agent, or Firm—Young & Thompson

[57] ABSTRACT

A domestic electrical appliance for food preparation has a generally cylindrical bowl and a vertical shaft rotatably mounted in this bowl. A beating/emulsifying tool of the invention is arranged to be mounted on the shaft. The tool comprises a disc arranged to extend near the bottom of the bowl and to be rotated by the vertical shaft. A series of radially directed projections are formed on one or both of the faces of the disc which can be used alone in the appliance for the preparation of emulsions such as mayonnaise. A cage can additionally be mounted in the bowl to cooperate with the disc for the effective beating of foodstuffs such as egg whites and cream.

5 Claims, 4 Drawing Figures

4,648,720

BEATING/EMULSIFYING TOOL FOR A DOMESTIC ELECTRICAL APPLIANCE FOR FOOD PREPARATION

FIELD OF THE INVENTION

The present invention relates to a tool for use in multi-function domestic electrical appliances for food preparation. Such appliances usually comprise generally cylindrical bowl with a substantially vertical axis and a substantially vertical shaft rotatably mounted in this bowl.

Food preparation appliances of this type are provided with a number of tools, each tool being intended for one or more specific operations such as chopping, kneading, shredding, beating or emulsifying. Some of the tools, for example chopping or shedding tools, are entirely satisfactory and for this reason are substantially the same for all the food preparation appliances presently offered on the market. This is not the case where beating and emulsifying tools are concerned. Present beating and emulsifying tools are of widely differing types and either perform their function somewhat inadequately or are only able to achieve the required results after a working time which is considered to be too long.

SUMMARY OF THE PRESENT INVENTION

It is an object of the invention to provide a beating and/or emulsifying tool which is able to perform the required functions in a satisfactory manner.

The present invention provides and electrical food preparation appliance which comprises a bowl generally cylindrical in shape with a substantially vertical axis, and a substantially vertical shaft rotatably mounted in said bowl, a beating/emulsifying tool comprising a disc having a substantially vertical axis, said disc extending near to the bottom of the bowl and being rotatable by way of said vertical shaft, and said disc having, on at least one of its upper and lower faces, a series of radially directed projections.

A tool of the invention has been found to be particularly effective in the preparation of emulsions, such as mayonnaise.

BRIEF DESCRIPTION OF THE DRAWINGS

An embodiment of the present invention will hereinafter be described, by way of example, with reference to the accompanying drawings, in which.

DESCRIPTION OF A PREFERRED EMBODIMENT

Figure 1:
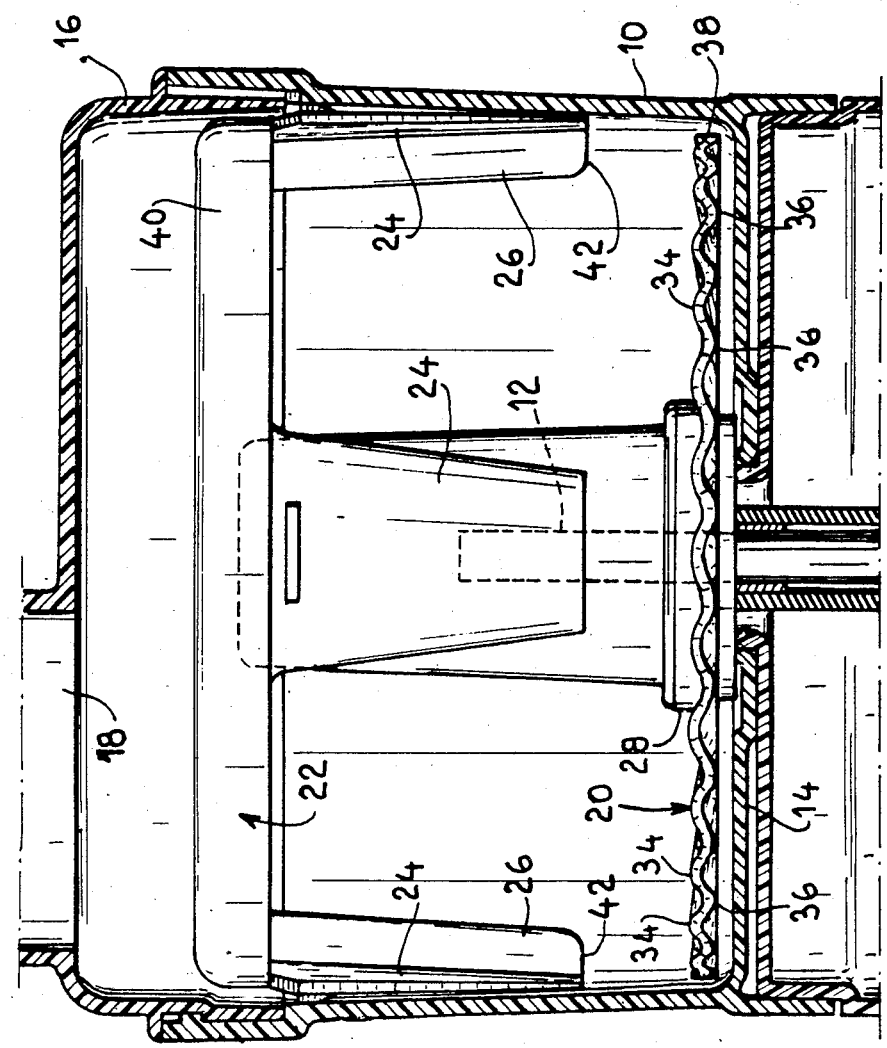
FIG. 1 is a partial view of a domestic electrical appliance equipped with a beating/emulsifying tool, the bowl of the appliance being shown in section and the tool being shown in section in elevation.
Figure 2:
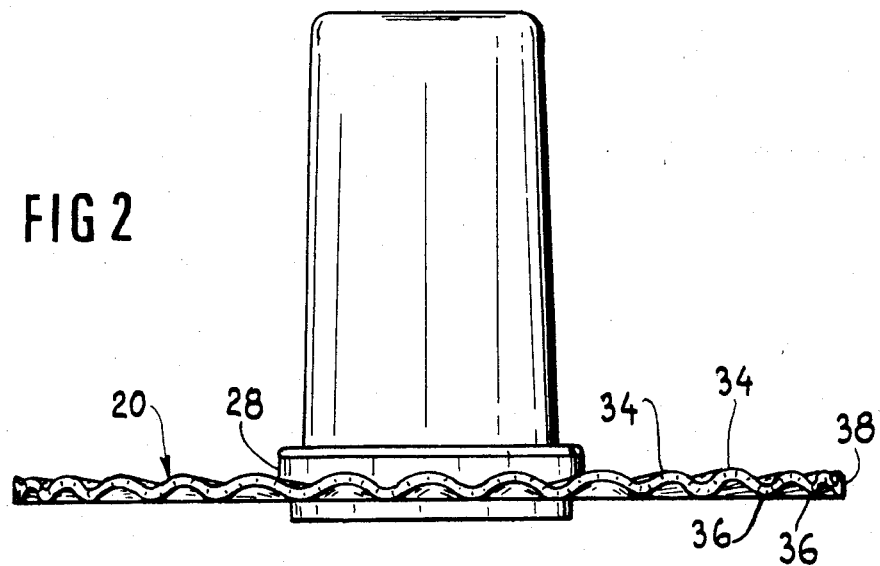
FIG. 2 shows an elevation of a disc forming part of the tool of FIG. 1.

The domestic electrical appliance partially illustrated in FIG. 1 comprises a work bowl 10 which is generally cylindrical in shape and has a vertical axis. A vertical shaft 12 is rotatably mounted in this bowl 10 and is driven by an electrical motor (not shown). The bottom 14 of the bowl 10 is substantially planar and horizontal. The bowl 10 is closed by a cover 16 in which an orifice 18 is formed for the introduction of ingredients into the bowl during operation.

Installed in the bowl 10 is a beating/emulsifying tool which comprises a rotary disc 20 having a vertical axis coupled to the shaft 12 and a fixed cylindrical cage 22. The cage 22 is comprised of four vertical bars 24 which form, on the inner side wall of the bowl 10, a series of four vertical ribs 26 directed radially inwardly.

Figure 3:
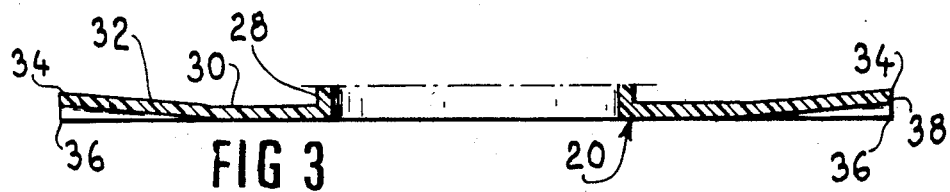
FIG. 3 is a partial section through the disc of FIG. 2.
Figure 4:
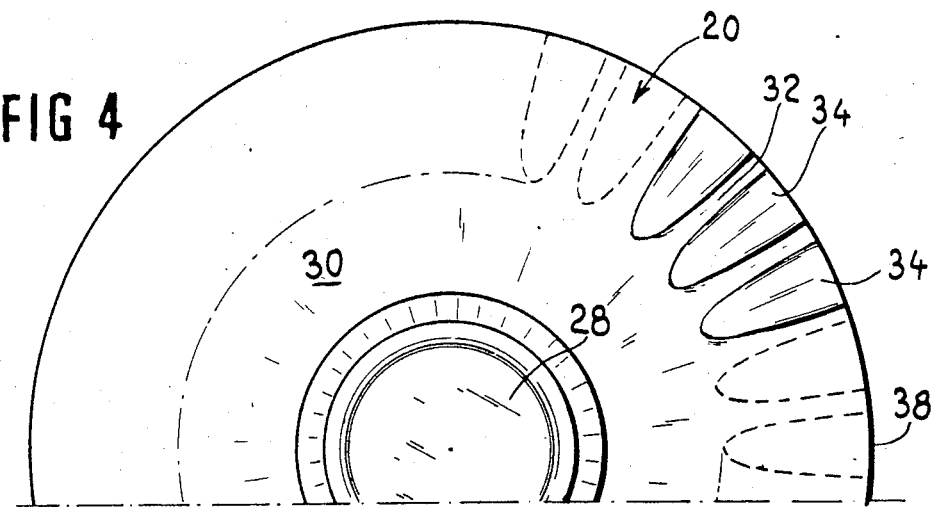
FIG. 4 is a partial plan view of the disc of FIGS. 2 and 3.

The disc 20 extends near to the bottom 14 of the bowl 10. The diameter of the disc 20 is only slightly less than the diameter of this bottom 14. The disc has a central zone 28 which carries the drive hub for the disc, a smooth plane intermediate zone 30 and a peripheral zone 32. The peripheral zone 32 possesses a uniform corrugation of sinusoidal profile which forms two series of radially directed projections 34 and 36 of rounded crest on the upper face and the lower face respectively. As can be seen clearly in FIG. 3, the projections 34 and 35 have a height which increses from the smooth zone 30 to the outer edge 38 of the disc. It will be noted that the crests of lower projections 36 are located in the plane of the lower face of the smooth zone 30, whilst the crests of the upper projections 34 are inclined relative to the plane of the upper face of the smooth zone 30.

The fixed cage 22 incorporates an annular reinforcement 40 rigidly connecting the bars 24. This reinforecement is removably engaged in the upper region of the bowl 10 coaxially of the bowl. The vertical bars 24 are directed downwardly and extend only over some of the height of the bowl 10, so that their lower ends 42 are located at a distance from the bottom 14 of the bowl.

The tool illustrated, formed by the combination of the rotary disc 20 and the fixed cage 22, is designed particularly for the preparation of whites of eggs beaten stiff and whipped cream. During this operation, the material being worked is driven in rotation by the disc 20; the ribs 26 and the cage 22 constitute stops which oppose the free rotation of the peripheral zone of the worked material, thus contributing to the inclusion of air in the material.

For the preparation of emulsions, for example of the mayonnaise type, the cage 22 is not placed in the bowl. The disc 20 alone with its corrugated edge makes it possible, because of its special shape, its large diameter and its proximity to the bottom of the bowl, to produce a good emulsion right from the start from a small quantity of material consisting, for example, of a single egg yolk and a little oil. To complete the preparation of the mayonnaise, the user will pour the necessary extra oil evenly through the orifice 18 in the cover 16 of the bowl.

I claim:

1. An electrical food preparation appliance which comprises a bowl generally cylindrical in shape with a substantially vertical axis, a substantially vertical shaft rotatably mounted in said bowl, a beating/emulsifying tool comprising a disc having a substantially vertical axis, said disc extending near to the bottom of the bowl and being rotatable by way of said vertical shaft, said disc having, on at least one of its upper and lower faces, a series of radially directed projections, and a cylindrical cage having an annular reinforcement which is removably engaged with the bowl, and which is coaxial relative to said bowl, and a series of vertical bars integral with said reinforcement and forming on the inner wall of the bowl a series of vertical ribs directed radially inwardly.

2. An appliance according to claim 1, wherein said annular reinforcement is located in the upper region of the bowl and said vertical bars are directed downwardly from said reinforcement, said bars extending over only some of the height of the bowl such that their lower ends are spaced from the bottom of the bowl.

3. An appliance according to claim 1, wherein the diameter of the disc is only slightly less than the diameter of the bottom of said bowl.

4. An appliance according to claim 1, wherein the peripheral zone of said disc has a uniform corrugation of sinusoidal profile forming a respective series of said radially directed projections both on the upper face and on the lower face of the disc, said projections having rounded crests.

5. An appliance according to claim 4, wherein said disc comprises a central zone carrying a drive hub, a corrugated peripheral zone and a smooth plane intermediate zone, and wherein the projections of the said corrugated peripheral zone have a height which increases from the said smooth zone up to the outer edge of the disc.

* * * * *